United States Patent [19]

Ogasawara

[11] 4,439,725

[45] Mar. 27, 1984

[54] MICRODISPLACEMENT DETECTOR

[76] Inventor: Hiroomi Ogasawara, 3821-4, Yamakita, Yamakitamachi-gun, Kanagawa-ken, Japan

[21] Appl. No.: 320,021

[22] Filed: Nov. 10, 1981

Related U.S. Application Data

[63] Continuation-in-part of Ser. No. 86,370, Oct. 18, 1979, Pat. No. 4,310,806.

[51] Int. Cl.³ .................................................. G01R 27/26
[52] U.S. Cl. .................................. 324/61 R; 324/61 P; 324/61 QS
[58] Field of Search ................ 324/61 P, 61 R, 61 QS

[56] References Cited

U.S. PATENT DOCUMENTS

| | | | |
|---|---|---|---|
| 2,718,619 | 9/1955 | Whittier | 324/61 R |
| 2,918,818 | 12/1959 | Meyer | 324/61 P |
| 3,031,617 | 4/1962 | Paquette | 324/61 R |
| 3,177,427 | 4/1965 | Kuntz et al. | 324/61 P |
| 3,312,892 | 4/1967 | Parnes | 324/61 R UX |
| 3,321,699 | 5/1967 | Rademakers | 324/61 P |
| 3,702,957 | 11/1972 | Wolfendale | 324/61 R UX |
| 3,860,918 | 1/1975 | Cencel | 324/61 R |
| 4,310,806 | 1/1982 | Ogasawara | 324/61 QS X |

FOREIGN PATENT DOCUMENTS 56-141512  11/1981  Japan ............................... 324/61 R

OTHER PUBLICATIONS

Brennemann, Linear Variable Capacitor Encoder, IBM Technical Disclosure Bulletin, Jan. 1980, pp. 3531, 3532.

Primary Examiner—Stanley T. Krawczewicz
Attorney, Agent, or Firm—Beveridge, De Grandi & Kline

[57] ABSTRACT

In a microdisplacement detector adapted to obtain a frequency signal corresponding to a microdisplacement of a feeler from two frequency signals which are provided by a movable electrode connected to the feeler and a pair of stationary electrodes disposed on both sides of the movable electrode, auxiliary stationary electrodes are provided for the aforementioned stationary electrodes so as to correct the capacitance variation characteristics of the differential capacitors which are formed by the stationary electrodes and the movable electrode, thereby to increase the range of measurement.

10 Claims, 8 Drawing Figures (a)

(b)

(a)

(b)

(a)

(b)

(a)

(b)

(a)

(b)

MICRODISPLACEMENT DETECTOR

CROSS REFERENCE TO RELATED APPLICATION

This application is a continuation-in-part of U.S. patent application Ser. No. 86,370, filed Oct. 18, 1979, now U.S. Pat. No. 4,310,806, issued Jan. 12, 1982.

BACKGROUND OF THE INVENTION

This invention relates to a micro-displacement detector, and more particularly to the structure of its sensor.

A variety of detectors adapted to mechanically detect a microdisplacement have been proposed in the art. One example of a conventional microdisplacement detector is arranged principally as shown in FIG. 1. In that detector, stationary electrodes $E_{11}$ and $E_{12}$ are on both sides of a movable electrode $E_V$, connected to a feeler, to form a pair of differential capacitors $C_1$ and $C_2$, respectively, thus forming a sensor. This sensor is coupled to a pair of oscillators $OSC_1$ and $OSC_2$ which are combined with crystal oscillator units $Xtal_1$ and $Xtal_2$, respectively, so that outputs of frequencies $f_1$ and $f_2$ corresonding to the capacitance variations of the differential capacitors are applied to a mixer MIX. In the mixer MIX, the difference frequency $(f_1-f_2)$ between these frequency outputs is obtained. The difference frequency is delivered as an output Fd. The output Fd is subjected to frequency-to-voltage conversion so as to be displayed on a meter for instance.

The variations of the output frequencies $f_1$ and $f_2$ of the oscillators $OSC_1$ and $OSC_2$ can be represented substantially as hyperbolic functions as indicated in the parts (a) and (b) of FIG. 2, respectively. These oscillator outputs $f_1$ and $f_2$ are applied to the mixer MIX, where the difference frequency is obtained as was described above. The difference frequency thus obtained corresponds to the shaded portion in the part (a) of FIG. 3, and can be expressed as a distance vs. frequency characteristic curve as shown in the part (b) of FIG. 3.

The characteristic curve in the part (b) of FIG. 3 is substantially S-shaped as a whole; however, it has a substantially linear part K extending on both sides of a central point P. Within the range of the linear part K, the frequency of the output Fd responds substantially linearly to the movement distance d of the feeler, and accordingly the displacement can be measured with high accuracy.

However, the linear part corresponds to only about 30% of the range of movement of the feeler. Therefore, if it is required to perform the measurement with high accuracy, the measurement is limited to a relatively small range. If, on the contrary, it is required to measure over a wide range, the accuracy must be decreased.

SUMMARY OF THE INVENTION

Accordingly, an object of this invention is to provide a microdisplacement meter with differential capacitors, in which the linear part of its distance vs. frequency characteristic curve is increased to provide a wide range of measurement.

The foregoing object and other objects of the invention have been achieved by the provision of a microdisplacement detector comprising: main stationary electrodes disposed on both sides of a movable electrode connected to a feeler, to form a pair of main differential capacitors; a pair of oscillators coupled to the differential capacitors to form a pair of frequency signals; and a mixer for obtaining a difference frequency signal from these frequency signals, to obtain a frequency signal corresponding to the mechanical displacement of the feeler; which, according to the invention, comprises, auxiliary stationary electrodes juxtaposed with the main stationary electrodes and cooperating with the movable electrode to form auxiliary differential capacitors which correct the capacitance variation characteristics of the main differential capacitors.

The principle, nature and utility of the invention will become more apparent from the following detailed description when read in conjunction with the accompanying drawings.

Figure 1:
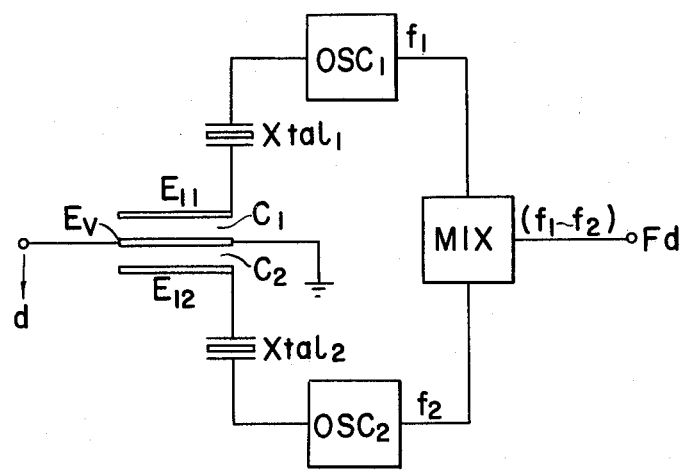
FIG. 1 is an explanatory diagram showing the arrangement of a conventional differential capacitor type microdisplacement detector.
Figure 2:
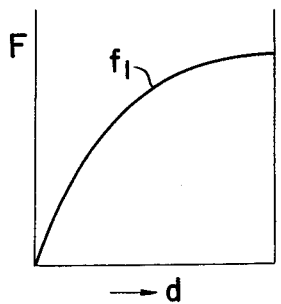
Figure 2:
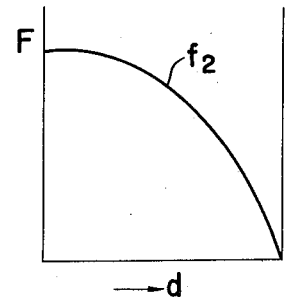
Figure 3:
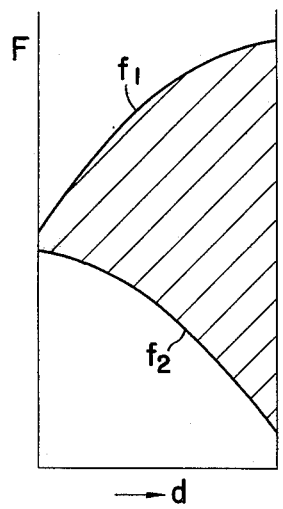
Figure 3:
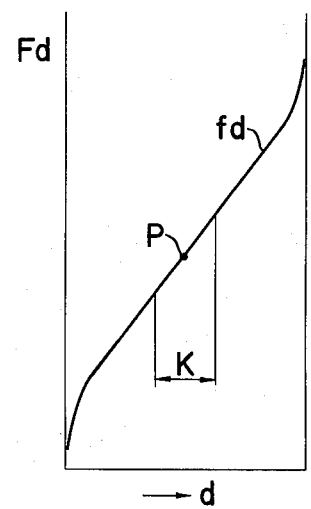
Figure 4:
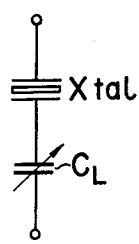
Figure 4:
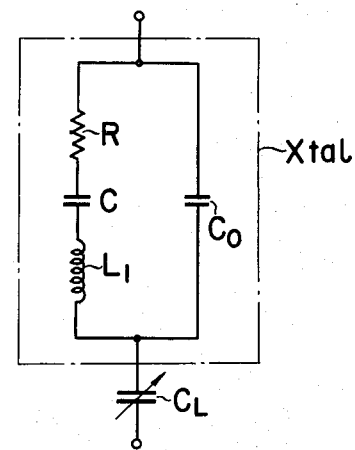
Figure 5:
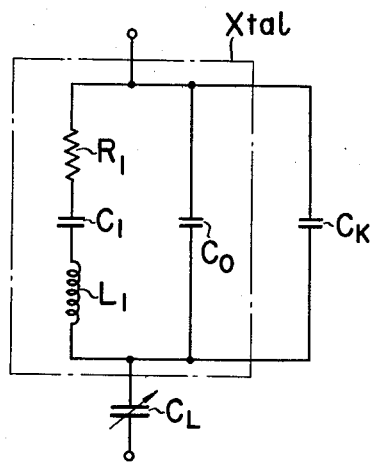
Figure 5:
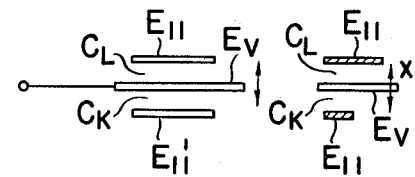
Figure 6:
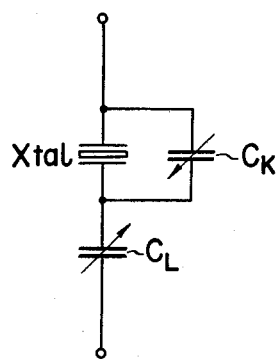
Figure 6:
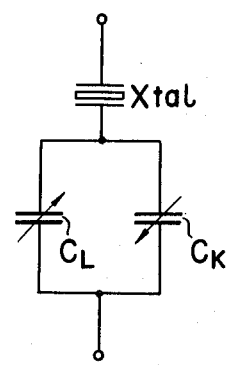
Figure 7:
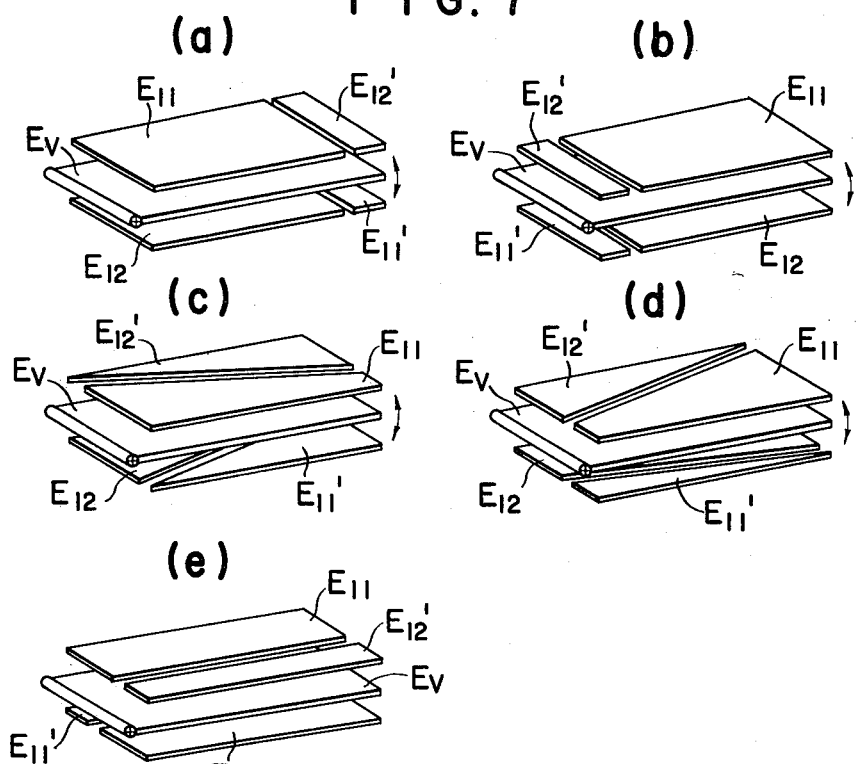
Figure 8:
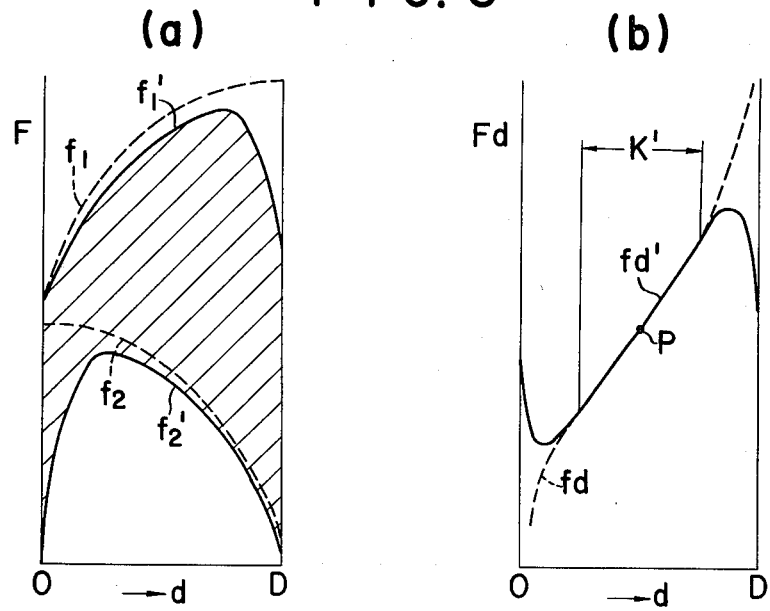

The parts (a) and (b) of FIG. 2 and the parts (a) and (b) of FIG. 3 are characteristic diagrams for a description of the operation of the detector shown in FIG. 1;

The parts (a) and (b) of FIG. 4 are circuit diagrams showing the part of the detector in FIG. 1 to which the technical concept of this invention is applied;

The parts (a) and (b) of FIG. 5 are a circuit diagram showing one example of a part of a microdisplacement detector according to the invention, and an explanatory diagram showing examples of the arrangement of electrodes in the detector, respectively;

The parts (a) and (b) of FIG. 6 are circuit diagrams showing other examples of the part of the microdisplacement detector according to the invention;

The parts (a) through (e) of FIG. 7 are explanatory diagrams showing other examples of the arrangement of electrodes in the detector of the invention; and The parts (a) and (b) of FIG. 8 are characteristic diagrams for a description of the operation of the detector according to the invention.

DETAILED DESCRIPTION OF THE INVENTION

The part (a) of FIG. 4 is a circuit diagram showing one capacitor $C_L$ of two differential capacitors in one example of a microdisplacement meter according to this invention and a crystal oscillator unit Xtal connected to the capacitor $C_L$. The crystal oscillator unit Xtal can be represented by an equivalent circuit consisting of a resistor $R_1$, capacitors $C_1$ and $C_0$ and an inductor $L_1$. Therefore, the circuit shown in the part (a) of FIG. 4 can be replaced by the equivalent circuit shown in the part (b).

The change of the capacitance variation characteristic of each of the differential capacitors, by adding a correcting capacitor thereto, is consequently the change of the constant variation characteristic of the circuit shown in FIG. 4. However, it should be noted that the circuit in FIG. 4 shows only one of the pair of differential capacitors.

The parts (a) and (b) of FIG. 5 show one example of the circuit which is obtained by adding a correcting capacitor $C_k$ to the circuit shown in the part (b) of FIG. 4, and show a capacitor which is obtained by combining one $C_L$ of the differential capacitors with the correcting capacitor $C_k$.

Since the capacitance variation characteristic of the capacitor $C_L$ is a hyperbolic function characteristic inversely proportional to the distance of movement of the movable electrode, the capacitor $C_L$ combined with the crystal oscillator unit shows a capacitance variation characteristic close to the hyperbolic function characteristic. When the substantially hyperbolic characteristics are differentially combined, then at the parts where the characteristics change steeply, or at the parts corresponding to the approach of the movable electrode to one of the stationary electrodes, the effect of one of the differential capacitors is considerably larger than that of the other, as a result of which the combined characteristic curve is S-shaped.

Therefore, the correcting capacitors are employed in order to suppress the effects of the pair of differential capacitors. The parts (a) and (b) of FIG. 5 show one example of the employment of the correcting capacitors. The correcting capacitor $C_k$ is connected in parallel to the crystal oscillator unit Xtal, so that it operates in differential mode with the capacitor $C_L$ to be corrected of the differential capacitors. In this case, the size of the correcting capacitor is smaller than that of the capacitor $C_L$.

The parts (a) and (b) of FIG. 6 show examples of the connection of the crystal oscillator unit, the capacitor $C_L$ to be corrected and the correcting capacitor $C_k$. In each of the examples, the constant variation characteristic of the circuit including the crystal oscillator unit is more moderate than that of the circuit which is not provided with the correcting capacitor.

The parts (a) through (e) of FIG. 7 show examples of the differential capacitors in which the capacitor $C_L$ to be corrected and the correcting capacitor $C_k$ are formed into one unit. In FIG. 7, reference character $E_v$ designates a movable electrode; $E_{11}$ and $E_{12}$, main stationary electrodes which form differential capacitors to be corrected, in cooperation with the movable electrode $E_v$; and $E_{11'}$ and $E_{12'}$, auxiliary stationary electrodes which form correcting capacitors. Not only the capacitances of the main differential capacitors to be corrected, but also the capacitances of the correcting auxiliary differential capacitors are varied in association with the mechanical motion of the movable electrode $E_v$. In this case, as the capacitance of each main capacitor increases, the capacitance of each auxiliary capacitor decreases; and as the capacitance of the main capacitor decreases, the capacitance of the auxiliary capacitor increases, as is apparent from FIG. 7.

The parts (a) and (b) of FIG. 8 show the detection characteristics of the detector according to the invention and correspond to the parts (a) and (b) of FIG. 3 provided for the conventional detector. In the part (a) of FIG. 8, the curve $f_1'$ corresponds to the curve $f_1$ (indicated by the broken line in the part (a) of FIG. 8) in the part (a) of FIG. 3, and the variation characteristic indicated by the curve $f_1'$ is a hyperbolic characteristic considerably corrected. More specifically, the curve $f_1$ rises hyperbolically with the distance d, while the curve $f_1'$ of the invention similarly rises substantially hyperbolically with the distance d; however, it falls abruptly when the distance reaches the maximum value D. The relationships between the distance d and the variations of the curves $f_2$ and $f_2'$ are opposite to those described above; however, the variations of the curves $f_2$ and $f_2'$ are similar to those of the curves $f_1$ and $f_1'$.

Thus, the difference frequency variation characteristic curve shown in the part (b) of FIG. 8 is such that the variation direction is changed around the distances O and D, and the middle part changes linearly. A linear part K' of the middle part of the characteristic curve is more then 60% of the part corresponding to the distance O-D. Thus, the linear part K' of the invention is more than twice the linear part K of the conventional detector.

In the above-described example, the crystal oscillator unit Xtal is connected in series to the capacitor $C_L$ to be corrected; however, the former may be connected in parallel to the latter to form the circuit. Furthermore, the crystal oscillator unit may be omitted.

The movable electrode $E_v$ shown is swung about the fulcrum at the end. However, it may be so designed as to move in parallel.

The arrangement of the auxiliary electrodes $E_{11'}$ and $E_{12'}$ may be so modified that they form angles with the main electrodes $E_{11}$ and $E_{12}$ or they stand on different levels from those of the main electrodes.

Furthermore, in the above-described examples, one auxiliary electrode ($E_{11'}$ or $E_{12'}$) is provided for each main electrode ($E_{11}$ or $E_{12}$); however, a plurality of auxiliary electrodes may be provided for each main electrode.

As is apparent from the above description, according to the invention, the auxiliary stationary electrodes provided separately from the main stationary electrode form the auxiliary differential capacitors which correct the capacitance variation characteristics of the differential capacitors. Therefore, the substantially linear part of the characteristic curve occupies more than 60% of the mechanical displacement range of the feeler. Thus, the detection characteristic of the detector according to the invention is much improved over that of the conventional detector.

What is claimed is:

1. A microdisplacement detector for detecting movement of an object comprising:

a sensor including (a) a movable electrode; (b) a first pair of stationary electrodes, the electrodes of said first pair of electrodes spaced from each other in parallel relationship with said movable electrode therebetween and spaced therefrom to form a first pair of capacitors, the capacitance of one capacitor of said first pair of capacitors increasing and the capacitance of the other capacitor of said first pair of capacitors decreasing as said movable electrode moves; (c) a second pair of stationary electrodes, the electrodes of said second pair of electrodes spaced from each other in parallel relationship with said movable electrode therebetween and spaced therefrom to form a second pair of capacitors, the capacitance of one capacitor of said second pair of capacitors increasing and the capacitance of the other capacitor of said second pair of capacitors decreasing as said movable electrode moves; and (d) means adapted for connecting said movable electrode for movement in response to movement of the object to cause the capacitances of the first capacitor of said first pair of capacitors and of the second capacitor of said second pair of capacitors to increase in response to movement of the object and the capacitances of the second capacitor of said first pair of capacitors and of the first capacitor of said second pair of capacitors to decrease in response to movement of the object;

a first oscillator circuit having incorporated therein as frequency varying components thereof said first capacitor of said first pair of capacitors and said first capacitor of said second pair of capacitors;

a second oscillator circuit having incorporated therein as frequency varying components thereof said second capacitor of said first pair of capacitors and said second capacitor of said second pair of capacitors; and a mixer connected to said first and second oscillator circuits for providing a frequency difference signal determined by the difference in the frequencies of said first and second oscillator circuits.

2. A microdisplacement detector as claimed in claim 1 in which the first electrode of said first pair of electrodes is on the same side of said movable electrode as the second electrode of said second pair of electrodes, and the second electrode of said first pair of electrodes is on the same side of said movable electrode as the first electrode of said second pair of electrodes.

3. A microdisplacement detector as claimed in claim 1 in which said movable electrode is adapted for pivoting about one end thereof in response to movement of the object.

4. A microdisplacement detector as claimed in claim 3 in which the electrodes of said first pair of electrodes are closer to said one end than are the electrodes of said second pair of electrodes.

5. A microdisplacement detector as claimed in claim 3 in which the electrodes of said second pair of electrodes are closer to said one end than are the electrodes of said first pair of electrodes.

6. A microdisplacement detector as claimed in claim 1 in which each of said electrodes is planar.

7. A microdisplacement detector as claimed in claim 6 in which each electrode of said first pair of electrodes has a first area and each electrode of said second pair of electrodes has a second area less than the first area.

8. A microdisplacement detector as claimed in claim 6 in which said first electrode of said first pair of electrodes and said second electrode of said second pair of electrodes are coplanar and in which said second electrode of said first pair of electrodes and said first electrode of said second pair of electrodes are coplanar.

9. A microdisplacement detector as claimed in claim 6 in which each electrode is substantially rectangular.

10. A microdisplacement detector as claimed in claim 6 in which each electrode of one of said pairs of electrodes is triangular.

* * * * *